United States Patent [19]

Inoue et al.

[11] Patent Number: 5,279,115
[45] Date of Patent: Jan. 18, 1994

[54] DEVICE FOR DETECTING THE DEGREE OF DETERIORATION OF A CATALYST

[75] Inventors: Toshio Inoue, Susono; Hiroshi Sawada, Gotenba, both of Japan

[73] Assignee: Toyota Jidosha Kabushiki Kaisha, Toyota, Japan

[21] Appl. No.: 988,328

[22] Filed: Dec. 9, 1992

[30] Foreign Application Priority Data

Dec. 18, 1991 [JP] Japan .................. 3-335034

[51] Int. Cl.$^5$ .................. F02F 3/26; F02B 19/00
[52] U.S. Cl. .................. 60/276; 60/277; 60/285
[58] Field of Search .................. 60/276, 277, 285

[56] References Cited

U.S. PATENT DOCUMENTS 4,739,614  4/1988  Katsuno et al. .................. 60/274

FOREIGN PATENT DOCUMENTS

| 60-231155 | 11/1985 | Japan . |
| 61-185634 | 8/1986 | Japan . |
| 62-29711 | 2/1987 | Japan . |
| 63-97852 | 4/1988 | Japan . |
| 63-147941 | 6/1988 | Japan . |
| 2-30915 | 2/1990 | Japan . |
| 2-33408 | 2/1990 | Japan . |
| 2-91440 | 3/1990 | Japan . |
| 2-207159 | 8/1990 | Japan . |
| 3-57862 | 3/1991 | Japan . |
| 3-134241 | 6/1991 | Japan . |
| 3-175129 | 7/1991 | Japan . |
| 3-286160 | 12/1991 | Japan . |

OTHER PUBLICATIONS

SAE Technical Paper Series 910561, pp. 135-146, Detection of Catalyst Failure On-Vehicle Using the Dual Oxygen Sensor Method.

SAE Technical Paper Serial 900062, pp. 1-18, Detection of Catalyst Performance Loss Using On-Board Diagnostics.

Primary Examiner—Noah P. Kamen
Attorney, Agent, or Firm—Oliff & Berridge

[57] ABSTRACT

A catalyst deterioration detecting device comprising a first air-fuel ratio sensor and a second air-fuel ratio sensor which are arranged in the exhaust passage upstream and downstream of the catalyst, respectively. When the air-fuel ratio of the mixture fed into the engine is changed over from the lean air-fuel ratio to the rich air-fuel ratio $(A/F)_R$, the air-fuel ratio detected by the second air-fuel ratio sensor is changed to the rich air-fuel ratio $(A/F)'_R$ after it is maintained at the stoichiometric air-fuel ratio for a time $\Delta T_R$. The deterioration of the catalyst is detected based on the difference $\Delta(A/F)$ between $(A/F)_R$ and $(A/F)'_R$.

10 Claims, 8 Drawing Sheets

DEVICE FOR DETECTING THE DEGREE OF DETERIORATION OF A CATALYST

BACKGROUND OF THE INVENTION

Field of the Invention

The present invention relates to a device for detecting the degree of deterioration of a catalyst.

Description of the Related Art

In an engine, an oxidizing and reducing catalyst is normally arranged in the exhaust passage to purify the exhaust gas. Such an oxidizing and reducing catalyst, for example, a three way catalyst has an $O_2$ storage function such that it absorbs and stores excess oxygen existing in the exhaust gas when the air-fuel ratio of the air-fuel mixture fed into the engine cylinder becomes larger than the stoichiometric air-fuel ratio, i.e., when the air-fuel mixture becomes lean, and that the catalyst released oxygen when the air-fuel ratio of the air-fuel mixture fed into the engine cylinder becomes smaller than the stoichiometric air-fuel ratio, i.e., when the air-fuel mixture becomes rich. Accordingly, where the air-fuel ratio is alternately changed on the rich side and the lean side of the stoichiometric air-fuel ratio, since excess oxygen is absorbed and stored in the three way catalyst due to the $O_2$ storage function thereof when the air-fuel mixture becomes lean, $NO_x$ is reduced. Conversely, when the air-fuel mixture becomes rich, since the oxygen which has been absorbed and stored in the three way catalyst is released therefrom, HC and CO are oxidized. Accordingly, $NO_x$, HC and CO can be purified at the same time.

Therefore, in a conventional engine, an air-fuel ratio detector for detecting the air-fuel ratio of the air-fuel mixture fed into the engine cylinder is arranged in the exhaust passage upstream of the catalyst. When the air-fuel mixture becomes lean, the amount of fuel to be fed is increased and, when the air-fuel mixture becomes rich, the amount of fuel to be fed is reduced. As a result, the air-fuel ratio is alternately changed on the rich side and the lean side of the stoichiometric air-fuel ratio, and thus the amount of $NO_x$, HC and CO is reduced at the same time.

However, if the three way catalyst deteriorates, the purifying rate of exhaust gas by the three way catalyst is reduced. In this case, since the exhaust gas is purified due to the $O_2$ storage function of the three way catalyst, if the $O_2$ storage function is weakened, the three way catalyst deteriorates. Accordingly, if the fact that the $O_2$ storage function is weakened can be detected, the deterioration of the three way catalyst can be detected.

Therefore, in a known engine, a second air-fuel ratio sensor is additionally arranged in the exhaust passage downstream of the three way catalyst. The air-fuel mixture fed into the engine cylinder is changed over from a rich mixture to a lean mixture after the air-fuel mixture is maintained at, for example, a rich mixture for a fixed time. After the changeover of the air-fuel mixture from the rich mixture to the lean mixture, the air-fuel ratio detected by the second air-fuel ratio is changed from the rich side to the lean side of the stoichiometric air-fuel ratio with a time interval. In this case, if this time interval is shorter than a predetermined time, it is determined that the three way catalyst is deteriorated (Japanese Unexamined Patent Publication No. 2-207159). In this engine, the deterioration of the three way catalyst is detected by noting the fact that, if the $O_2$ storage function is weakened, when the air-fuel mixture fed into the engine cylinder is changed over, for example, from a rich mixture to a lean mixture, the length of time during which the second air-fuel ratio thereafter continues to produce a rich signal indicating that the air-fuel ratio is on the rich side becomes short.

Now, the ability of the three way catalyst for reducing $NO_x$ and oxidizing CO and HC decreases as the actual amount of oxygen which can be stored in the three way catalyst is reduced. Accordingly, the actual amount of oxygen which can be stored in the three way catalyst correctly represents the degree of deterioration of the three way catalyst. Therefore, to correctly detect the degree of deterioration of the three way catalyst, it is necessary to correctly detect the actual amount of oxygen which can be stored in the three way catalyst. In this case, the actual amount of oxygen which can be stored in the three way catalyst cannot be found based on only the length of time during which the second air-fuel ratio continues to produce the rich signal in the above-mentioned engine, and therefore, in the above-mentioned engine, a problem arises in that it is impossible to correctly detect the degree of deterioration of the three way catalyst.

SUMMARY OF THE INVENTION

An object of the present invention is to provide a device capable of correctly detecting the degree of deterioration of a catalyst.

According to the present invention, there is provided a device for detecting the degree of deterioration of an oxidizing and reducing catalyst having an oxygen storage function, the device comprising: an exhaust gas passage in which the catalyst is arranged, an exhaust gas produced by burning fuel flowing within the exhaust gas passage; a first air-fuel ratio sensor arranged in the exhaust gas passage upstream of the catalyst to detect an air-fuel ratio from a concentration of unburned components contained in an exhaust gas; a second air-fuel ratio sensor arranged in the exhaust gas passage downstream of the catalyst to detect an air-fuel ratio from the concentration of unburned components contained in the exhaust gas; and deterioration determining means for determining a degree of deterioration of the catalyst from a difference between the air-fuel ratio detected by the first air-fuel ratio sensor and the air-fuel ratio detected by the second air-fuel ratio sensor after a releasing operation of oxygen stored in the catalyst is completed by maintaining the air-fuel ratio of the exhaust gas flowing into the catalyst on the rich side of the stoichiometric air-fuel ratio.

The present invention may be more fully understood from the description of a preferred embodiment of the invention set forth below, together with the accompanying drawings.

DESCRIPTION OF A PREFERRED EMBODIMENT

Figure 1:
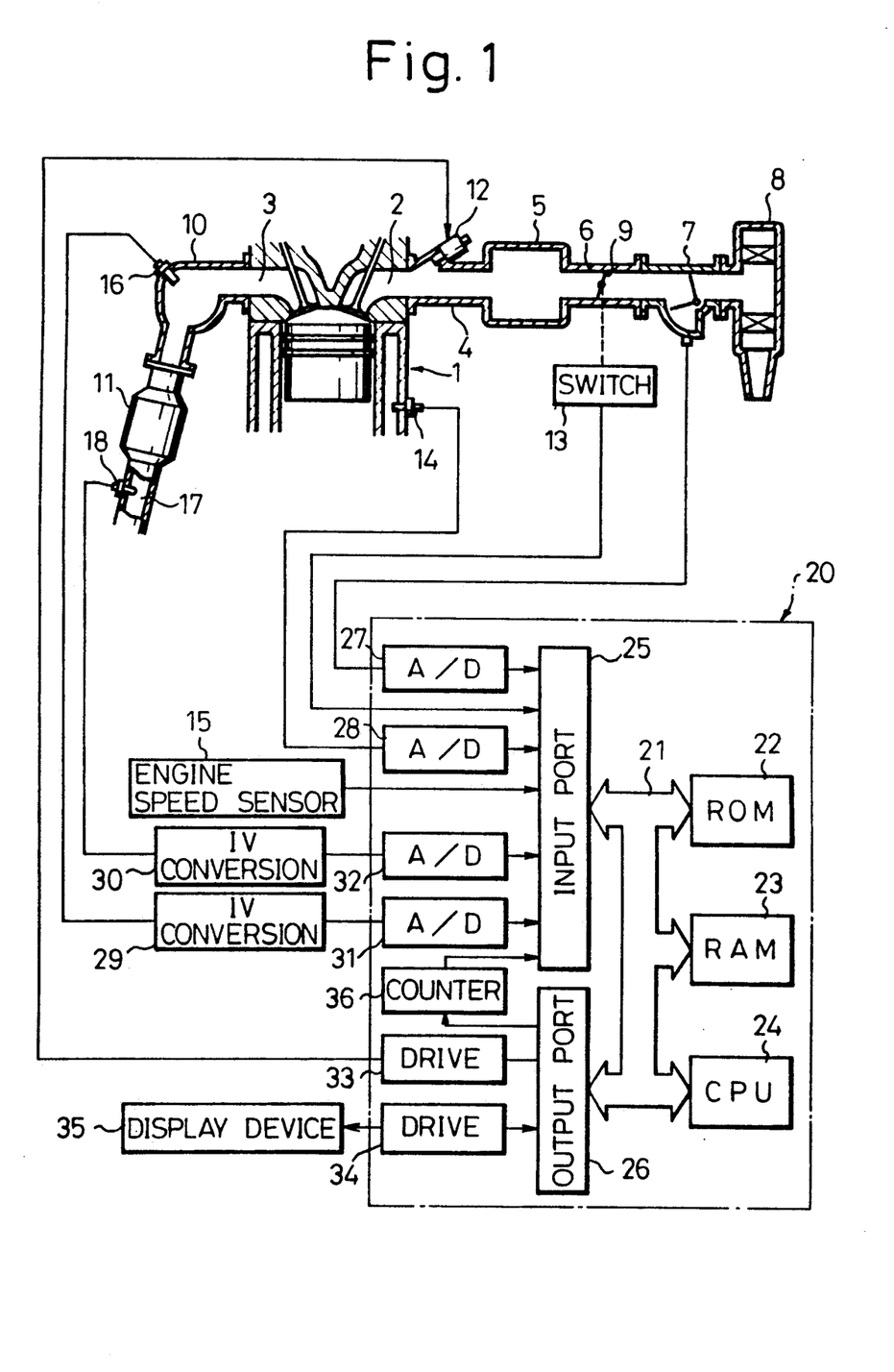
FIG. 1 is a general view of an engine.

Referring to FIG. 1, reference numeral 1 designates an engine body, 2 an intake port and 3 an exhaust port. The intake port 2 is connected to a surge tank 5 via a corresponding branch pipe 4, and the surge tank 5 is connected to an air cleaner 8 via an intake duct 6 and an air flow meter 7. A throttle valve 9 is arranged in the intake duct 6. The exhaust port 3 is connected to a catalytic converter 11 containing therein a three way catalyst, which is an oxidizing and reducing catalyst, via an exhaust manifold 10. A fuel injector 12 which is controlled based on a signal output from an electronic control unit 20 is arranged in each branch pipe 4.

The electronic control unit 20 comprises a ROM (read only memory) 22, a RAM (random access memory) 23, a CPU (microprocessor etc.) 24, an input port 25 and an output port 26. The ROM 22, the RAM 23, the CPU 24, the input port 25 and the output port 26 are interconnected to each other via a bidirectional bus 21. The air flow meter 7 produces an output voltage which is proportional to the amount of air fed into the engine cylinder, and this output voltage is input into the input port 25 via an AD converter 27. An idle switch 13 which is made ON when the throttle valve 9 is in the idling position is attached to the throttle valve 9, and the output signal of this idle switch 13 is input into the input port 25. A coolant temperature sensor 14 producing an output voltage which is proportional to the temperature of the cooling water of the engine is mounted on the engine body 1, and the output voltage of the coolant temperature sensor 14 is put into the input port 25 via an AD converter 28. In addition, an engine speed sensor 15 which produces an output pulse representing the engine speed is connected to the input port 25.

A first air-fuel ratio sensor 16 is arranged in the exhaust passage upstream of the catalytic converter 11, for example, in exhaust manifold 10, and a second air-fuel ratio sensor 18 arranged in the exhaust passage 17 downstream of the catalytic converter 11. The first air-fuel ratio sensor 16 and the second air-fuel ratio sensor 18 are connected to the output port 25 via corresponding current-voltage converting circuits 29, 30 and corresponding AD converters 31, 32. The output port 26 is connected, on one hand, to the fuel injector 12 via a drive circuit 33 and, on the other hand, to a display device 35 for displaying the degree of deterioration of the catalyst via a drive circuit 34. In addition, the electronic control unit 20 further comprises a counter 36. This counter 36 is reset by the count reset signal output to the output port 26 and, once the counter 36 is reset, the counting up operation of the counter 36 is instantaneously started. The count value of this counter 36 is input into the input port 25.

Figure 2A:
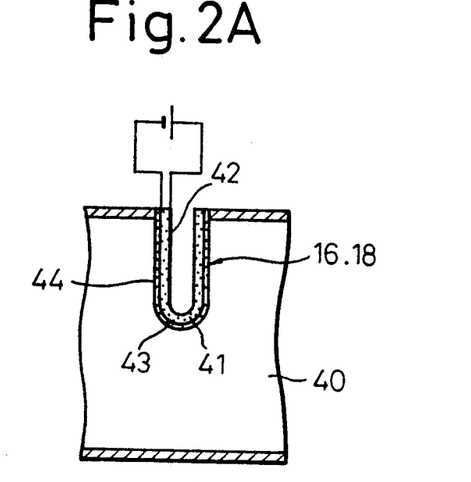
FIGS. 2A and 2B are views illustrating the operation of the air-fuel ratio sensors.
Figure 2B:
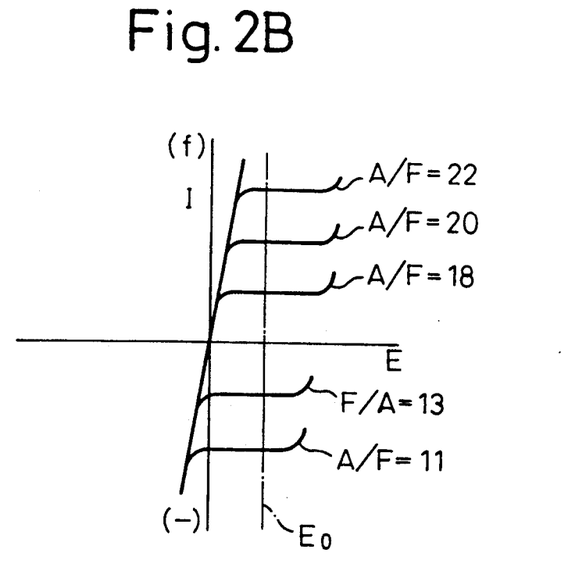

FIG. 2A illustrates a schematic view of the first air-fuel ratio sensor 16 and the second air-fuel ratio sensor 18. The first air-fuel ratio sensor 16 and the second air-fuel ratio sensor 18 each comprises a tubular member 41 made of zirconia. The anode 42 made of a platinous thin layer is formed on the inner face of the tubular member 41, and the cathode 43 made of a platinous thin layer is formed on the outer wall of the tubular member 41. In addition, the cathode 44 is covered by, for example, a porous layer 44. The inner space of the tubular member 41 is in communication with the outside air, and a fixed voltage is applied between the anode 42 and the cathode 43. In this case, a current I which varies in accordance with a change in the air-fuel ratio as illustrated in FIG. 2B flows between the anode 42 and the cathode 43. Note that, in FIG. 2B, the abscissa E indicates the voltage applied between the anode 42 and the cathode 43.

Where the air-fuel ratio is on the rich side, i.e., a large amount of unburned components is contained in the exhaust gas flowing within the exhaust passage 40, the unburned components pass through the porous layer 44 by dispersion and reach the cathode 43. Then, the unburned components combine with oxygen on the cathode 43 and are burned. If the oxygen on the cathode 43 is consumed, oxygen ions move in the zirconia tubular member 41 toward the cathode 43 to feed oxygen onto the cathode 43. As a result, a current I flows between the anode 42 and the cathode 43. The amount of this current I is proportional to the amount of oxygen which is consumed on the cathode 43, and accordingly, the amount of the current I is proportional to the concentration of the unburned components in the exhaust gas. If the air-fuel ratio is fixed, the concentration of the unburned components in the exhaust gas is accordingly fixed. Therefore, the amount of the current I varies in accordance with a change in the air-fuel ratio A/F as illustrated in FIG. 2B.

Figure 3A:
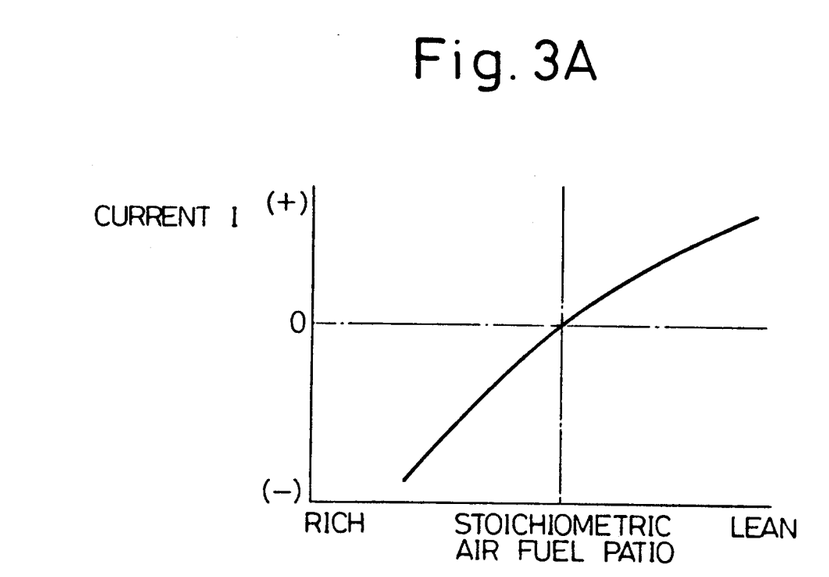
FIGS. 3A and 3B are diagrams illustrating the output of the air-fuel ratio sensor.
Figure 3B:
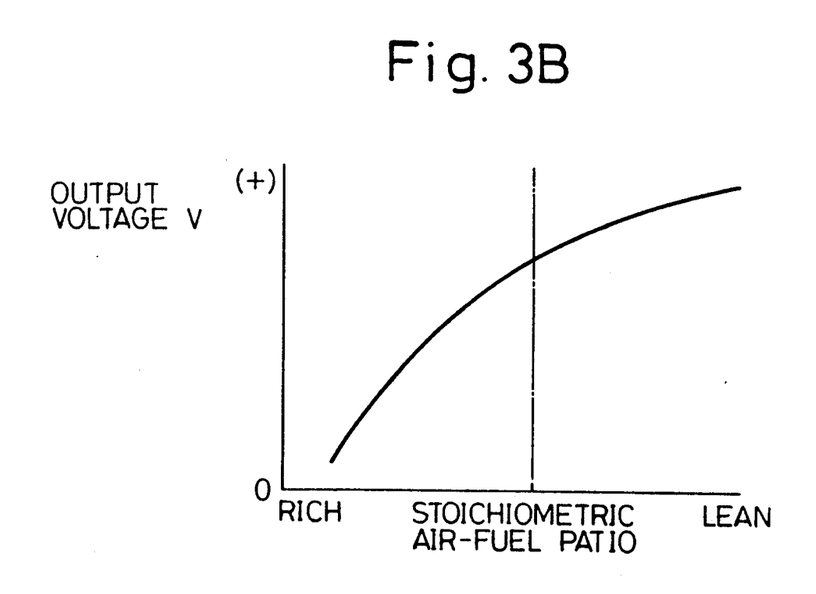

If the voltage illustrated by $E_O$ in FIG. 2B is applied between the anode 42 and the cathode 43, a current I which varies in accordance with a change in the air-fuel ratio A/F as illustrated in FIG. 3A flows between the anode 42 and the cathode 43 of the first air-fuel ratio sensor 16 and between the anode 42 and the cathode 43 of the second air-fuel ratio sensor 18. This current I is converted to a corresponding voltage in the corresponding current-voltage converting circuits 29, 30, and an output voltage V which varies in accordance with a change in the air-fuel ratio as illustrated in FIG. 3B is produced at the output terminals of the current-voltage converting circuits 29, 30. Accordingly, the air-fuel ratio can be detected by the output voltages V of the current-voltage converting circuits 29, 30.

In the embodiment according to the present invention, the fuel injection time TAU of the fuel injector 12 is calculated based on the following formula.

$$TAU = TP \cdot FAF \cdot GA \cdot C \cdot M$$

where
TP: basic fuel injection time
FAF: feedback correction coefficient
GA: learning coefficient
C: enrichment coefficient
M: air-fuel ratio determining coefficient The basic fuel injection time TP is a fuel injection time required to make the air-fuel ratio of air-fuel mixture fed into the engine equal to the stoichiometric air-fuel ratio, and this basic fuel injection time TP is stored in advance in the ROM 22 as a function of the engine load Q/N (the amount of air Q fed into the engine cylinder/the engine speed N) and the engine speed N.

The feedback correction coefficient FAF is controlled by the output signal of the first air-fuel ratio sensor 16 in order to maintain the air-fuel ratio at a target air-fuel ratio. This feedback correction coefficient FAF alternately increases and decreases relative to 1.0.

The learning coefficient GA is a coefficient for causing the feedback correction coefficient FAF to increase or decrease relative to 1.0.

The enrichment coefficient C is a coefficient for increasing the amount of fuel to be fed at the time of warm-up of the engine or at the time of acceleration of the engine. This enrichment coefficient is made 1.0 when the increase operation of the amount of fuel is not carried out.

The air-fuel ratio determining coefficient M is a coefficient for obtaining a target air-fuel ratio which is determined in advance in accordance with the operating state of the engine. The air-fuel ratio determining coefficient M is made 1.0 when the target air-fuel ratio is the stoichiometric air-fuel ratio.

Next, the feedback correction coefficient FAF and the learning coefficient GA will be briefly described with reference to FIGS. 4 and 5. Note that, if the target air-fuel ratio is $(A/F)_O$, the air-fuel ratio determining coefficient M is made the stoichiometric air-fuel ratio/the target air-fuel ratio $(A/F)_O$.

Figure 4:
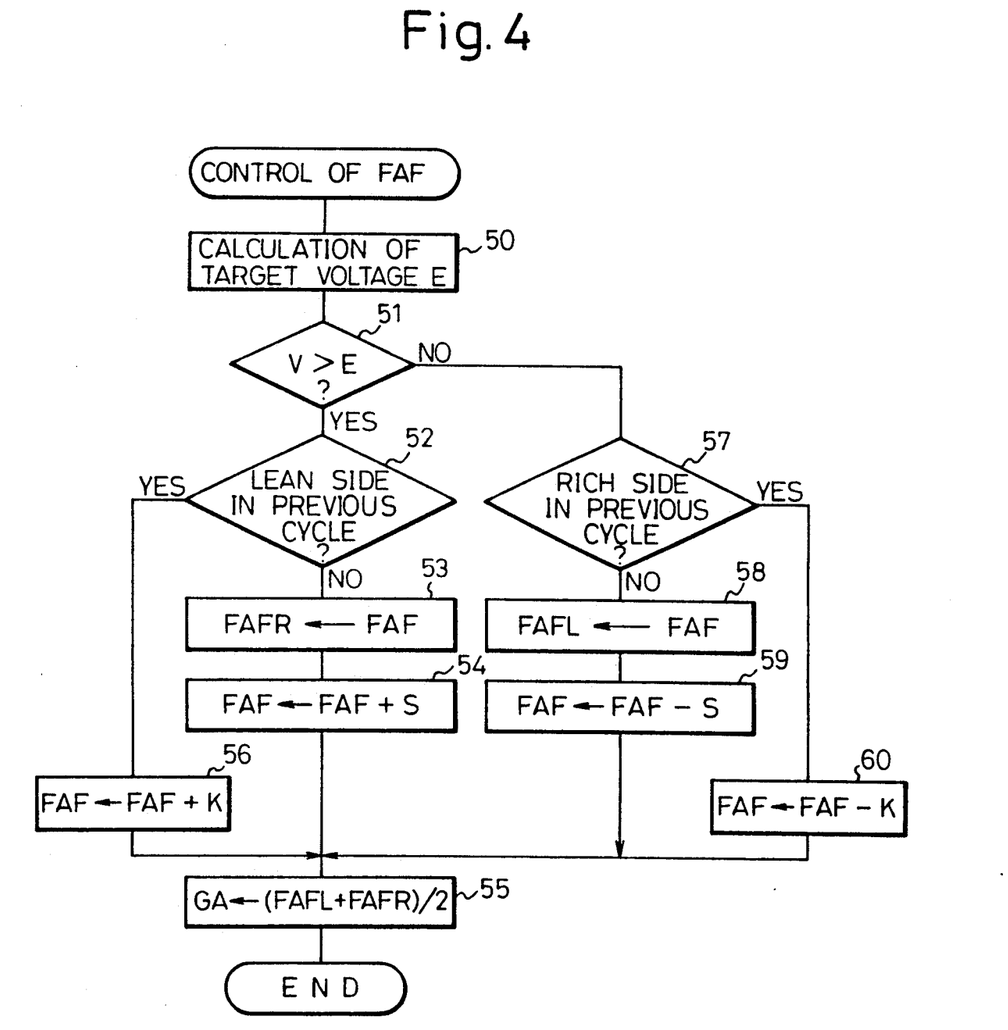
FIG. 4 is a flow chart showing control of the feedback correction coefficient.

FIG. 4 illustrates a routine processed by sequential interruptions which are executed at predetermined time intervals.

Referring to FIG. 4, in step 50, the target output voltage E of the current-voltage converting circuit 29 of the first air-fuel ratio sensor 16, which voltage E corresponds to the target air-fuel ratio $(A/F)_O$, is calculated based on the relationship illustrated in FIG. 3B. Where the air-fuel ratio determining coefficient M is made the stoichiometric air-fuel ratio/the target air-fuel ratio $(A/F)_O$, if the injection of fuel is carried out for the time TP·M, the air-fuel ratio becomes approximately equal to the target air-fuel ratio $(A/F)_O$. Accordingly, at this time, the output voltage of the current-voltage converting circuit 29 of the first air-fuel ratio sensor 16 becomes approximately equal to the target output voltage E.

If the target output voltage E is calculated in step 50, the routine goes to step 51, and it is determined whether or not the output voltage V of the current-voltage converting circuit 29 of the first air-fuel ratio 16 is higher than the target output voltage E, i.e., the air-fuel ratio detected by the first air-fuel ratio sensor 16 is on the lean side of the target air-fuel ratio $(A/F)_O$. If $V > E$, i.e., when the air-fuel ratio is on the lean side of the target air-fuel ratio $(A/F)_O$, the routine goes to step 52, and it is determined whether or not the air-fuel ratio was on the lean side of the target air-fuel ratio $(A/F)_O$, in the previous processing cycle. When the air-fuel ratio was not on the lean side of the target air-fuel ratio $(A/F)_O$, it is determined that the air-fuel ratio has changed from the rich side to the lean side, and the routine goes to step 53. In step 53, the feedback correction coefficient FAF is memorized as FAFR. Then, in step 54, the skip value S is added to FAF, and then the routine goes to step 55. Conversely, if it is determined in step 52 that the air-fuel ratio was also on the lean side of the target air-fuel ratio $(A/F)_O$ in the previous processing cycle, the routine goes to step 56, and the integral value K is added to FAF (K < S). Then, the routine goes to step 55. Accordingly, as illustrated in FIG. 5, when the air-fuel ratio changes from the rich side to the lean side, the feedback correction coefficient FAF is abruptly increased by the skip value S and then gradually increased.

If it is determined in step 51 that $V \leq E$, i.e., the air-fuel ratio is on the rich side of the target air-fuel ratio $(A/F)_O$, the routine goes to step 57, and it is determined whether or not the air-fuel ratio was on the rich side of the target air-fuel ratio $(A/F)_O$ in the previous processing cycle. When the air-fuel ratio was not on the rich side, it is determined that the air-fuel ratio has changed from the lean side to the rich side, and the routine goes to step 58. In step 58, the feedback correction coefficient FAF is memorized as FAFL. Then, in step 59, the skip value S is subtracted from FAF, and then the routine goes to step 55. Conversely, if it is determined in step 57 that the air-fuel ratio was also on the rich side of the target air-fuel ratio $(A/F)_O$ in the previous processing cycle, the routine goes to step 60, and the integral value K (K < S) is subtracted from FAF. Then, the routine goes to step 55. Accordingly, as illustrated in FIG. 5, when the air-fuel ratio changes from the lean side to the rich side, the feedback correction coefficient FAF is abruptly reduced by the skip value S and then gradually reduced.

Then, in step 55, the mean value of FAFL and FAFR is memorized as the learning coefficient GA. If the feedback correction coefficient FAF becomes larger than 1.0, since the learning coefficient GA also becomes larger than 1.0, the value of FAF becomes small. Conversely, if FAF becomes smaller than 1.0, since GA also becomes smaller than 1.0, the value of FAF becomes large. Thus, FAF is caused to alternately increase and decrease relative to 1.0.

Figure 5:
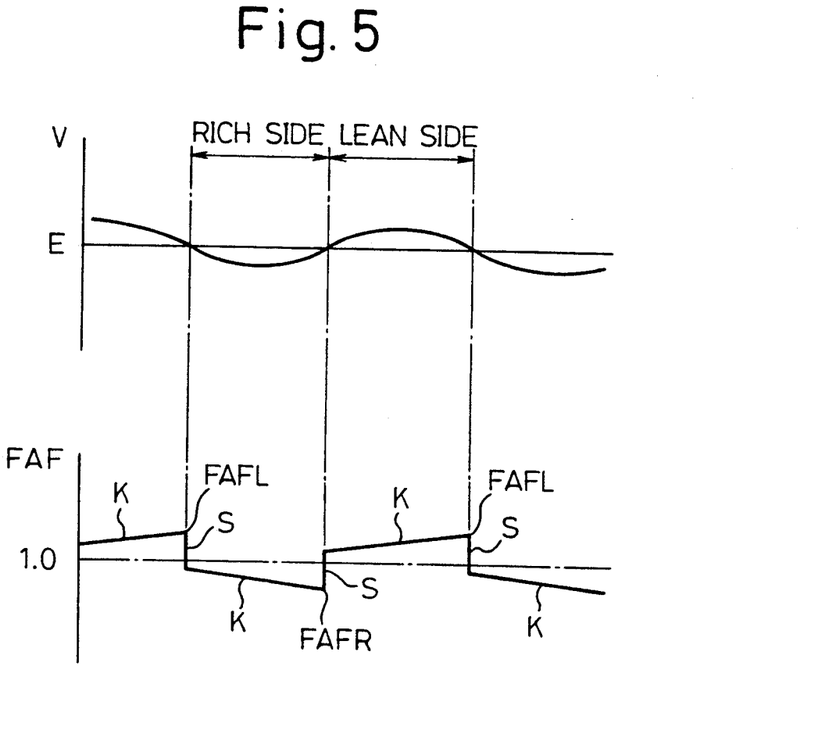
FIG. 5 is a diagram illustrating a change in the feedback correction coefficient.

The changing pattern of the feedback correction coefficient FAF illustrated in FIG. 5 does not change even if the target air-fuel ratio $(A/F)_O$ changes. For example, even if the target air-fuel ratio $(A/F)_O$ is the stoichiometric air-fuel ratio, FAF is caused to alternately increase and decrease relative to 1.0. Accordingly, where the target air-fuel ratio $(A/F)_O$ is the stoichiometric air-fuel ratio, i.e., the air-fuel ratio determining coefficient is equal to 1.0, if the value of FAF is made a fixed value 1.0, i.e., the feedback control of the air-fuel ratio is stopped, the air-fuel ratio is maintained at the stoichiometric air-fuel ratio. Similarly, where the target air-fuel ratio $(A/F)_O$ is not the stoichiometric air-fuel ratio, if the air-fuel ratio determining coefficient M is made a value corresponding to the target air-fuel ratio $(A/F)_O$ and, in addition, FAF is made a fixed value 1.0, the air-fuel ratio is maintained at the target air-fuel ratio $(A/F)_O$. Accordingly, to make the air-fuel ratio equal to the target air-fuel ratio $(A/F)_O$, it is sufficient to merely make the air-fuel ratio determining coefficient M a value corresponding to the target air-fuel ratio $(A/F)_O$ and make FAF a fixed value 1.0.

Figure 6:
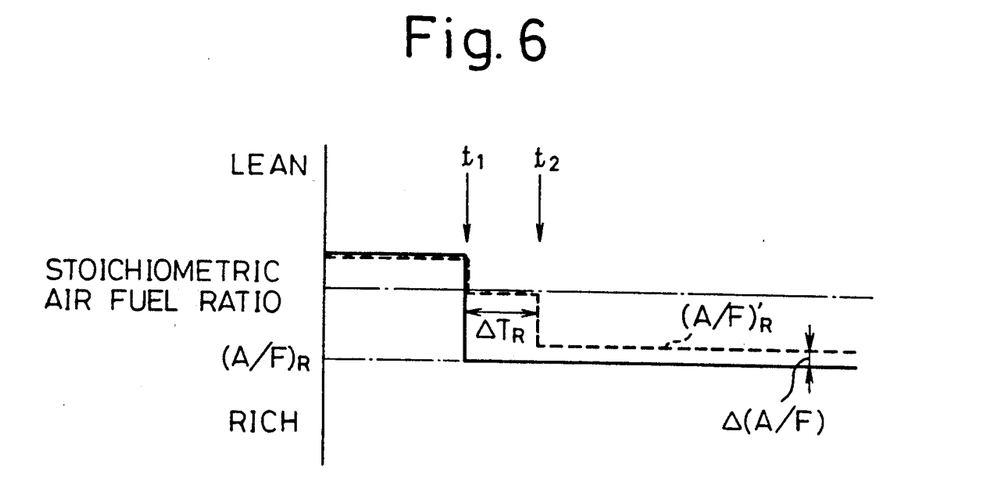
FIG. 6 is a diagram illustrating changes in air-fuel ratios detected by the first air-fuel ratio sensor and the second air-fuel ratio sensor.
Figure 7:
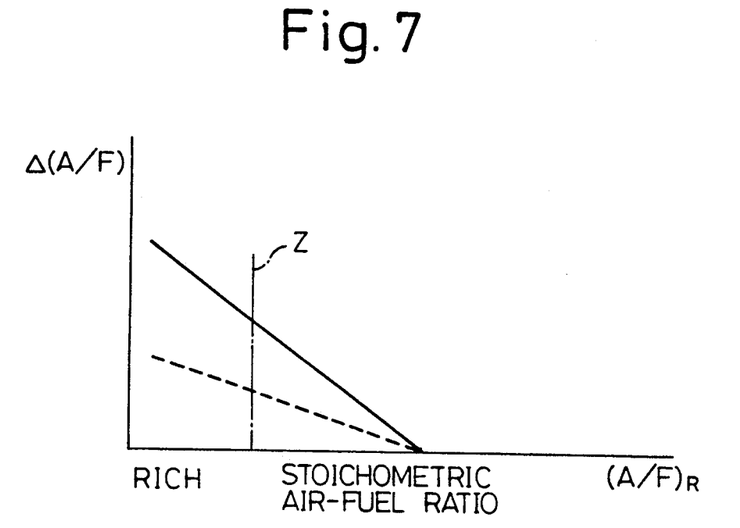
FIG. 7 is a diagram illustrating the difference $\Delta(A/F)$.

A method of detecting the degree of the deterioration of the three way catalyst will be hereinafter described with reference to FIG. 6. In FIG. 6, the solid line indicates an air-fuel ratio detected by the first air-fuel ratio sensor 16, and the broken line indicates an air-fuel ratio detected by the second air-fuel ratio sensor 18. In addition, FIG. 7 illustrates the case where the air-fuel ratio of the air-fuel mixture fed into the engine cylinder is caused to forcibly change over from the lean air-fuel ratio (the air-fuel ratio on the lean side of the stoichiometric air-fuel ratio) to the rich air-fuel ratio $(A/F)_R$ (the air-fuel ratio on the rich side of the stoichiometric air-fuel ratio) at the time $t_1$. As can be seen from FIG. 6, when the air-fuel ratio of the mixture fed into the engine cylinder is caused to change over from the lean air-fuel ratio to the rich air-fuel ratio $(A/F)_R$ at the time $t_1$, the air-fuel ratio detected by the first air-fuel ratio sensor 16 also changes from the lean air-fuel ratio to the rich air-fuel ratio $(A/F)_R$. Conversely, as illustrated by the broken line in FIG. 6, the air-fuel ratio detected by the second air-fuel ratio sensor 18 changes in a pattern which is different from that of the air-fuel ratio detected by the first air-fuel ratio sensor 16. Namely, when the air-fuel ratio of the mixture fed into the engine cylinder is caused to change over from the lean air-fuel ratio to the rich air-fuel ratio $(A/F)_R$ at the time $t_1$, the air-fuel ratio detected by the second air-fuel ratio sensor 18 changes from the lean air-fuel ratio to the stoichiometric air-fuel ratio. After this, the air-fuel ratio detected by the second air-fuel ratio sensor 18 is maintained at the stoichiometric air-fuel ratio for the time $\Delta T_R$ and then changes to the rich air-fuel ratio $(A/F)'_R$ which is larger than $(A/F)_R$.

It is due to the oxygen storage function of the three way catalyst that, when the air-fuel ratio of the mixture fed into the engine cylinder is changed over as mentioned above, the air-fuel ratio detected by the second air-fuel ratio detector 18 is maintained at the stoichiometric air-fuel ratio for some time. Namely, when the air-fuel ratio of the mixture fed into the engine cylinder is the lean air-fuel ratio, excess oxygen exists in the exhaust gas, and this excess oxygen is absorbed and stored in the three way catalyst. When the air-fuel ratio of the mixture fed into the engine cylinder is caused to change over from the lean air-fuel ratio to the rich air-fuel ratio $(A/F)_R$ at the time $t_1$, the exhaust gas contains therein the amount of unburned components such as CO, HC, $H_2$, which amount corresponds to the air-fuel ratio and, at this time, the oxygen stored in the three way catalyst is used for oxidizing the unburned components. The air-fuel ratio detected by the second air-fuel ratio sensor 18 is maintained at the stoichiometric air-fuel ratio for the time for which the oxidizing operation of the unburned components by the oxygen stored in the three way catalyst is carried out, i.e., for the time $\Delta T_R$ in FIG. 6. After this, when the oxygen stored in the three way catalyst disappears, the oxidizing operation of the unburned components is no longer carried out, and thus the air-fuel ratio detected by the second air-fuel ratio sensor 18 changes to the rich air-fuel ratio $(A/F)'_R$.

After the time $t_2$, the oxidizing operation of the unburned components by the oxygen stored in the three way catalyst is completed, and only the promoting operation of the oxidizing and reducing reaction by the three way catalyst is carried out. Namely, even when the air-fuel ratio is on the rich side of the stoichiometric air-fuel ratio, the oxygen $O_2$ which has not contributed to the combustion exists in the exhaust gas, and $NO_x$ also exists in the exhaust gas. At this time, the combining reaction of the unburned components and the oxygen $O_2$ which has not contributed to the combustion, i.e., the oxidizing operation of the unburned components is promoted by the three way catalyst. In addition, at this time, the operation in which the unburned components take away oxygen from $NO_x$, i.e., the reducing operation is promoted by the three way catalyst, and the operation in which the unburned components are combined with the oxygen which is taken away from $NO_x$, i.e., the oxidizing operation is promoted by the three way catalyst. As a result, if the exhaust gas passes through the three way catalyst, the concentration of the unburned components are reduced.

As mentioned above, the first air-fuel ratio sensor 16 and the second air-fuel ratio sensor 18 detect an air-fuel ratio from the concentration of the unburned components. Accordingly, after the time $t_2$, the rich air-fuel ratio $(A/F)'_R$ detected by the second air-fuel ratio sensor 18 becomes larger than the rich air-fuel ratio $(A/F)_R$ detected by the first air-fuel ratio sensor 16. The promoting operation of the oxidizing and reducing reaction by the three way catalyst is weakened as the three way catalyst deteriorates. In addition, the difference $\Delta(A/F)$ between $(A/F)'_R$ and $(A/F)$ becomes small as the promoting operation of the oxidizing and reducing operation by the three way catalyst is weakened. Accordingly, the difference $\Delta(A/F)$ properly represents the degree of deterioration of the three way catalyst.

FIG. 7 illustrates the relationship between the difference $\Delta(A/F)$ $(= (A/F)'_R - (A/F)_R)$ and the rich air-fuel ratio $(A/F)_R$ which is obtained when the air-fuel ratio is made the rich air-fuel ratio $(A/F)_R$ at the time $t_1$ in FIG. 6. In FIG. 7, the solid line illustrates the case where the three way catalyst does not deteriorate, and the broken line illustrates the case where the three way catalyst deteriorates. As can be seen from FIG. 7, the difference $\Delta(A/F)$ becomes large as the degree of richness of the rich air-fuel ratio $(A/F)_R$ becomes great regardless of whether or not the three way catalyst deteriorates, and where the degree of richness of the rich air-fuel ratio $(A/F)_R$ is the same, the difference $\Delta(A/F)$ becomes small as the three way catalyst deteriorates.

Figure 8:
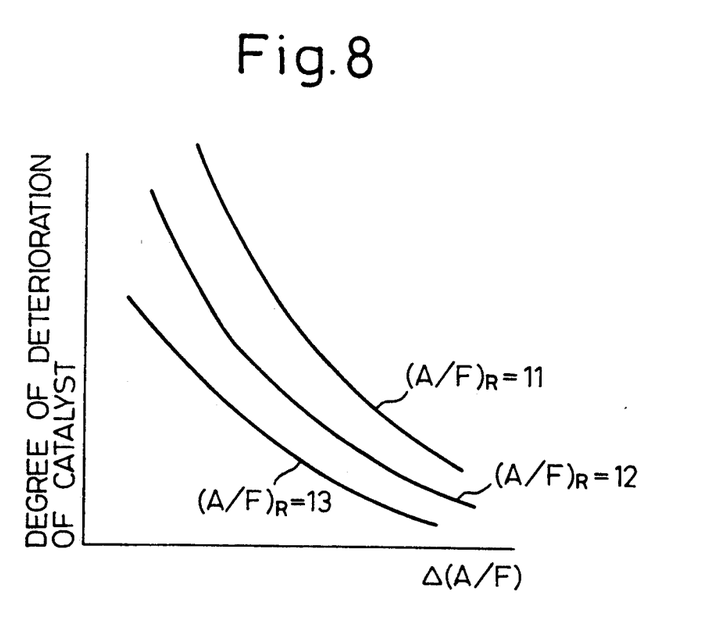
FIG. 8 is a diagram illustrating the degree of deterioration of the catalyst.

FIG. 8 illustrates the relationship among the degree of richness of the rich air-fuel ratio $(A/F)_R$, the difference $\Delta(A/F)$ and the degree of deterioration of the three way catalyst. As can be seen from FIG. 8, where the degree of richness of the rich air-fuel ratio $(A/F)_R$ is the same, the degree of deterioration of the three way catalyst becomes great as the difference $\Delta/F)$ becomes small.

Note that the current I flowing between the anode 42 and the cathode 43 of the first air-fuel ratio sensor 16 and between the anode 42 and the cathode 43 of the second air-fuel ratio sensor 18 changes toward the minus side as the pressure of the exhaust gas becomes high, and thereby the amount of the unburned components in the exhaust gas becomes large. Namely, the output voltage V illustrated in FIG. 3B becomes low as the pressure of the exhaust gas becomes high. Accordingly, the air-fuel ratios detected by the first air-fuel ratio sensor 16 and the second air-fuel ratio sensor 18 become on the richer side as the pressure of the exhaust gas becomes high. In this case, if the air-fuel ratios detected by the first air-fuel ratio sensor 16 and the second air-fuel ratio sensor 18 are multiplied by the absolute pressure P of the exhaust gas/the normal atmospheric pressure $P_O$ (absolute pressure), it is possible to eliminate of the deviation of the detected air-fuel ratio, which is caused by the influence of the pressure of the exhaust gas.

However, where the difference between the pressure P of the exhaust gas and the normal atmospheric pressure $P_O$ is within about 50 mmHg, the air-fuel ratios detected by the first air-fuel ratio sensor 16 and the second air-fuel ratio sensor 18 do not substantially deviate from the actual air-fuel ratio and thus, in this case, it is not necessary to correct the detected air-fuel ratios by the pressure P of the exhaust gas. In the embodiment according to the present invention, since the deterioration detecting device is constructed so that the detecting operation of the degree of deterioration of the three way catalyst is carried out when the difference between the pressure P of the exhaust gas and the normal atmospheric pressure $P_O$ is lower than 50 mmHg, the correction of the detected air-fuel ratio by the pressure P of the exhaust gas is not carried out. Where such correction is necessary, it is necessary to arrange the exhaust gas pressure sensors in the exhaust manifold 10 and the exhaust passage 17.

As mentioned above, in the present invention, the degree of deterioration of the three way catalyst is detected from the difference $\Delta(A/F)$ between the rich air-fuel ratio $(A/F)_R$ and $(A/F)'_R$ after the time $t_2$. Namely, the air-fuel ratio detected by the second air-fuel ratio sensor 18 becomes equal to the stoichiometric air-fuel ratio during the time between $t_1$ and $t_2$ in FIG. 6 regardless of the degree of deterioration of the three way catalyst. Accordingly, the degree of deterioration of the three way catalyst cannot be obtained by only the difference $\Delta(A/F)$ during the time between $t_1$ and $t_2$, and thus the degree of deterioration of the catalyst is obtained from the difference $\Delta(A/F)$ after the time $t_2$ in FIG. 6. In this case, as mentioned above, the pressure of the exhaust gas does not have an influence on the value of $\Delta(A/F)$ as long as the difference between the pressure P of the exhaust gas and the normal atmospheric pressure $P_O$ is lower than about 50 mmHg.

In the embodiment according to the present invention, the rich air-fuel ratio $(A/F)_R$ which is changed over at the time $t_1$ in FIG. 6 is determined in advance. This rich air-fuel ratio $(A/F)_R$ is, for example, an air-fuel ratio indicated by Z in FIG. 7, and the relationship between the difference $\Delta(A/F)$ and the degree of deterioration, which is illustrated in FIG. 8 and obtained when using the rich air-fuel ratio Z, is stored in advance in the ROM 22.

Figure 9:
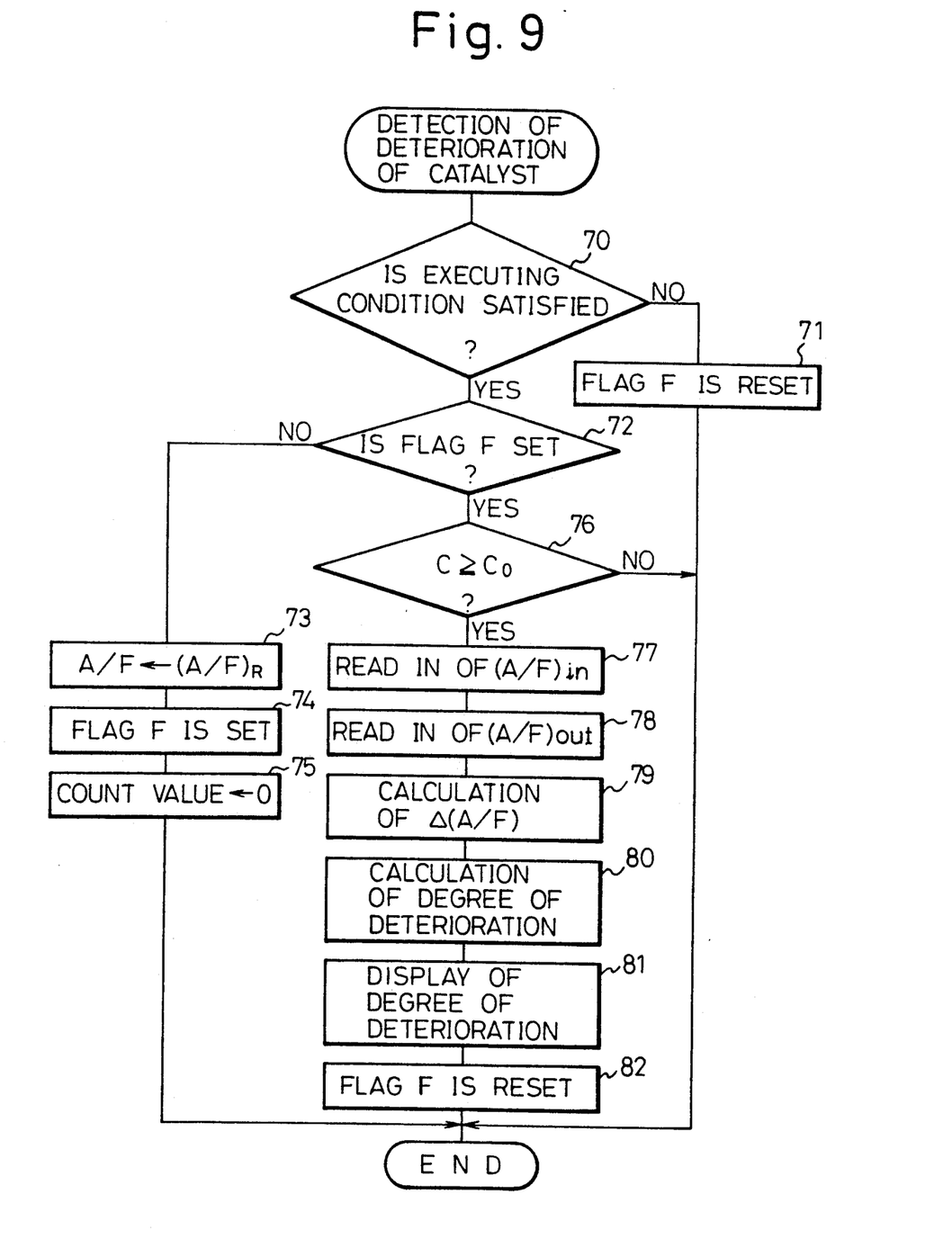
FIG. 9 is a flow chart for detecting the degree of deterioration of the catalyst.
Figure 10:
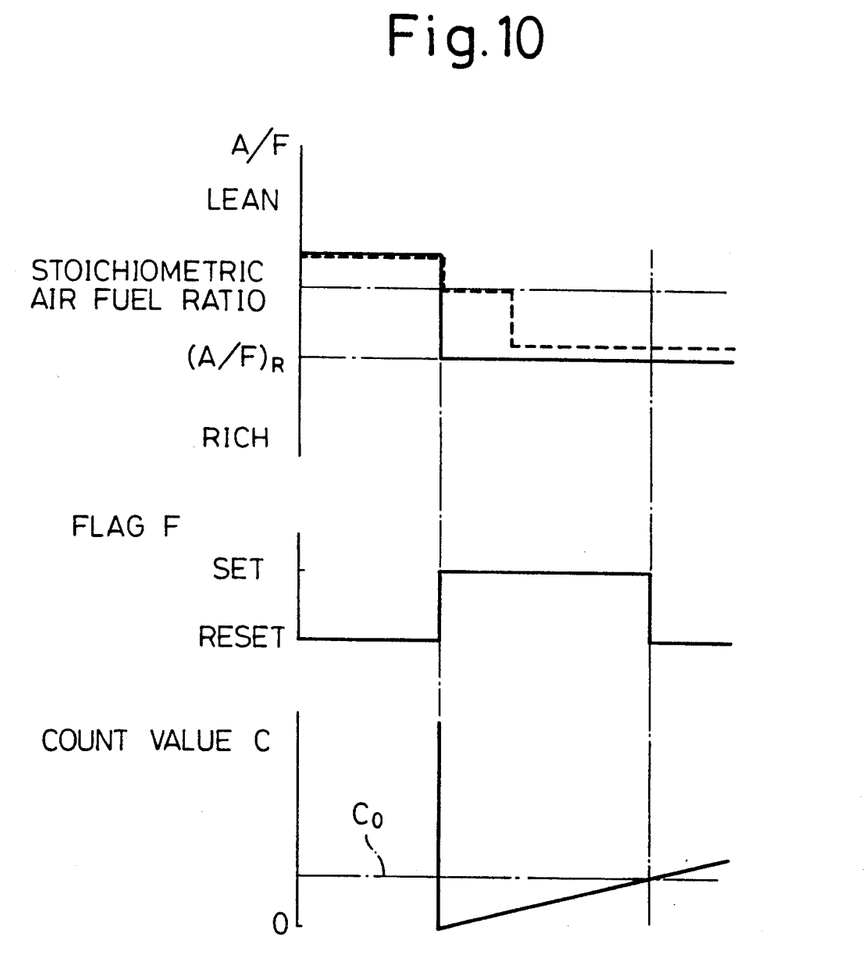
FIG. 10 is a time chart.

FIG. 9 illustrates a routine for detecting the degree of deterioration of the three way catalyst, and FIG. 10 illustrates a time chart.

Referring to FIG. 9, in step 70, it is determined whether or not the condition for executing the detection of the degree of deterioration of the three way catalyst is satisfied. For example, when the temperature of the engine coolant is higher than a predetermined temperature, when the air-fuel ratio sensors 16, 18 produce a regular output voltage, and when the engine is operating in a state where the difference between the pressure P of the exhaust gas and the normal atmospheric pressure $P_O$ is lower than 50 mmHg, it is determined that the executing condition is satisfied. When the executing condition is not satisfied, the routine goes to step 71, and a flag F indicating that the detecting operation of the degree of deterioration of the three way catalyst is being carried out is reset. Then, the processing cycle is completed.

When the executing condition is satisfied, the routine goes from step 70 to step 72, and it is determined whether or not the flag F is set. At this time, since the flag F is reset, the routine goes to step 73. In step 73, the air-fuel ratio A/F of the mixture fed into the engine cylinder is made the predetermined rich air-fuel ratio $(A/F)_R$. Namely, the air-fuel ratio determining coefficient M is made a value corresponding to the rich air-fuel ratio $(A/F)_R$, and the feedback correction coefficient FAF is made a fixed value 1.0. Then, in step 74, the flag F is set, and then the routine goes to step 75. In step 75, a data indicating that the counter 36 is to be reset is output to the output port 26, and thereby the count value of the counter 36 is made zero. When the counter 36 is reset, the counting up operation of the counter 36 is instantaneously started.

In the next processing cycle, the routine goes from step 72 to step 76, and it is determined whether or not the count value C exceeds $C_O$, i.e., a time necessary for the three way catalyst to release oxygen stored therein has elapsed. When the count value C exceeds $C_O$, the routine goes to step 77. In step 77, the air-fuel ratio $(A/F)_{in}$ detected by the first air-fuel ratio sensor 16 is read in, and then, in step 78, the air-fuel ratio $(A/F)_{out}$ detected by the second air-fuel ratio sensor 18 is read in. Then, in step 79, the difference $\Delta(A/F)$ (= $(A/F)_{out} - (A/F)_{in}$) is calculated. Then, in step 80, the degree of deterioration of the three way catalyst is calculated from the relationship illustrated in FIG. 8. Then, in step 81, the degree of deterioration of the three way catalyst is displayed by the display device 35. In this case, the degree of deterioration of the three way catalyst thus calculated may be stored in a so called back-up RAM (not shown) to which a power continues to be supplied from a battery even if the engine is stopped, to retain the information to be memorized. Then, in step 82, the flag F is reset.

In the hereinbefore described embodiment, as illustrated in FIG. 6, the air-fuel ratio is maintained at a fixed rich air-fuel ratio $(A/F)_R$ after the time $t_1$, and the degree of deterioration of the three way catalyst is detected from the difference $\Delta(A/F)$ between this rich air-fuel ratio $(A/F)_R$ and $(A/F)'_R$. However, it is not always necessary to make the rich air-fuel ratio $(A/F)_R$, which is used when the difference $\Delta(A/F)$ is found, equal to the rich air-fuel ratio (A/F) which is used from the time $t_1$ to when the difference $\Delta(A/F)$ is found, and, for example, it may be possible to make the rich air-fuel ratio $(A/F)_R$, which is used when the difference $\Delta(A/F)$ is found, smaller than the rich air-fuel ratio $(A/F)_R$ which is used from time $t_1$ to the time $t_2$. Namely, the important point is that the air-fuel ratio is maintained on the rich side of the stoichiometric air-fuel ratio for some time until the difference $\Delta(A/F)$ is found so that the releasing operation of oxygen stored in the three way catalyst has been completed by the time the difference $\Delta(A/F)$ is found.

While the invention has been described by reference to a specific embodiment chosen for purposes of illustration, it should be apparent that numerous modifications could be made thereto by those skilled in the art without departing from the basic concept and scope of the invention.

We claim:

1. A device for detecting the degree of deterioration of an oxidizing and reducing catalyst having an oxygen storage function, said device comprising:
   an exhaust gas passage in which the catalyst is arranged, an exhaust gas produced by burning fuel flowing within said exhaust gas passage;
   a first air-fuel ratio sensor arranged in said exhaust gas passage upstream of the catalyst to detect an air-fuel ratio from a concentration of unburned components contained in an exhaust gas;

a second air-fuel ratio sensor arranged in said exhaust gas passage downstream of the catalyst to detect an air-fuel ratio from the concentration of unburned components contained in the exhaust gas; and deterioration determining means for determining a degree of deterioration of the catalyst from a difference between the air-fuel ratio detected by said first air-fuel ratio sensor and the air-fuel ratio detected by said second air-fuel ratio sensor after a releasing operation of oxygen stored in the catalyst is completed by maintaining the air-fuel ratio of the exhaust gas flowing into the catalyst on the rich side of the stoichiometric air-fuel ratio.

2. A device according to claim 1, further comprising memory means for memorizing a relationship between said difference and said degree of deterioration of the catalyst, said deterioration determining means determining said degree of deterioration of the catalyst from said difference on the basis of said relationship.

3. A device according to claim 1, further comprising: air-fuel ratio changeover means for changing over the air-fuel ratio of the exhaust gas flowing into the catalyst, from a lean air-fuel ratio to a rich air-fuel fuel ratio; and calculating means for calculating a length of time which is necessary for the catalyst to release the oxygen stored therein after the air-fuel ratio is changed over to said rich air-fuel ratio, said deterioration determining means determining said degree of deterioration of the catalyst after said length of time has elapsed.

4. A device according to claim 3, wherein said length of time is a fixed time.

5. A device according to claim 3, further comprising memory means for memorizing said rich air-fuel ratio and said lean air-fuel ratio, said air-fuel ratio changeover means controlling an amount of fuel fed into the engine to make the air-fuel ratio of said air-fuel mixture equal to one of said rich air-fuel ratio and said lean air-fuel mixture which are memorized by said memorizing means.

6. A device according to claim 5, wherein said air-fuel ratio changeover means controls the amount of fuel fed into the engine on the basis of an output signal of said first air-fuel ratio sensor to make an air-fuel ratio detected by said first air-fuel ratio sensor equal to one of said rich air-fuel ratio and said lean air-fuel ratio which are memorized by said memorizing means.

7. A device according to claim 6, in which the engine has a fuel injector for feeding fuel into the engine, wherein a fuel injection time TAU by said fuel injector is calculated by the following formula.

$$TAU = TP \cdot FAF \cdot GA \cdot M$$

Where:
TP is a basic fuel injection time determined by an operating state of the engine.
FAF is a feedback correction coefficient increasing and decreasing relative to a reference value in accordance with a change in the air-fuel ratio detected by said first air-fuel ratio sensor to make the air-fuel ratio of said air-fuel mixture equal to a target air-fuel ratio.
GA is a learning coefficient for maintaining the value of FAF at said reference value.
M is an air-fuel ratio determining coefficient represented by the stoichiometric air-fuel ratio/said target air-fuel ratio.

8. A device according to claim 7, wherein said air-fuel ratio changeover means makes the value of FAF said reference value and makes said target air-fuel ratio said rich air-fuel ratio when the air-fuel ratio of said air-fuel mixture should be made said rich air-fuel ratio.

9. A device according to claim 1, wherein said deterioration determining means determines the degree of deterioration of the catalyst in a state where a difference between a normal atmospheric pressure and a pressure in said exhaust gas passage is lower than about 50 mmHg.

10. A device according to claim 9, wherein said exhaust gas passage is an exhaust gas passage of an engine, and said deterioration determining means determines the degree of deterioration of the catalyst when the engine is operating in said state.

* * * * *